(12) United States Patent
Xu et al.

(10) Patent No.: US 8,437,637 B2
(45) Date of Patent: May 7, 2013

(54) METHODS AND SYSTEMS FOR MULTICAST CONTROL

(75) Inventors: Jing Xu, Shandong (CN); Lian-kuan Chen, Hong Kong (CN); Chun-kit Chan, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 348 days.

(21) Appl. No.: 12/955,730

(22) Filed: Nov. 29, 2010

(65) Prior Publication Data

US 2012/0134669 A1    May 31, 2012

(51) Int. Cl.
   *H04J 14/00*    (2006.01)
(52) U.S. Cl.
   USPC .......................................................... 398/68
(58) Field of Classification Search .................... 398/66, 398/68
   See application file for complete search history.

(56) References Cited

U.S. PATENT DOCUMENTS

| | | |
|---|---|---|
| 2005/0129404 A1 | 6/2005 | Kim et al. |
| 2006/0127091 A1 | 6/2006 | Yoo et al. |

OTHER PUBLICATIONS

M. Zhu et al., "Novel WDM-PON architecture for simultaneous transmission of unicast data and multicast services", Chinese Optics Letter, vol. 8, No. 10, Oct. 2010.*

Cai et al., "Video-Service-Overlaid Wavelength-Division-Multiplexed Passive Optical Network," IEEE Photonics Technology Letters 21(14):990-992, 2009.

Cho et al., "Broadcast Transmission in WDM-PON Using a Broadband Light Source," Optical Fiber Communication Conference OFC 2007, Anaheim, California, Mar. 2007, 3 pages.

Deng et al., "A WDM Passive Optical Network With Centralized Light Sources and Multicast Overlay," IEEE Photonics Technology Letters 20(2): 114-116, 2008.

Kim et al., "Traffic Share-Based Multicast Scheduling for Broadcast Video Delivery in Shared-WDM-Pons," Journal of Lightwave Technology 25(9):2814-2827, 2007.

Le et al., "An AWG-Based WDM PON With Wavelength Multicasting for Restricted Customers," Fourth International Conference on Communications and Networking in China, ChinaCom, 2009, 5 pages.

Martinez et al., "Multiservice Hybrid Radio Over Fiber and Baseband AWG-PON Using CWDM and Spectral Periodicity of Arrayed Waveguide Gratings," IEEE Photonics Technology Letters 16(2):599-601, 2004.

(Continued)

*Primary Examiner* — Shi K Li
(74) *Attorney, Agent, or Firm* — Seed IP Law Group PLLC (57) ABSTRACT

Disclosed are a system and a method for controlling multicast data. The system may comprise: a plurality of transceivers, each of which comprises a laser configured to generate an optical carrier, the generated optical carrier being modulated by electrical downstream p-t-p data so as to generate optical downstream p-t-p IRZ signal; a PM configured to modulate the generated optical downstream p-t-p IRZ signal by electrical multicast data so as to generate orthogonally modulated signal; and a DI configured to demodulate the orthogonally modulated data and has a frequency response peak or dip in response to the demodulating, wherein an offset of a laser center wavelength of the laser from the frequency response peak or dip is adjustable so as to selectively enable or disable the multicast data.

35 Claims, 5 Drawing Sheets

OTHER PUBLICATIONS

Moon et al., "Overlay of Broadcasting Signal in a WDM-PON," Proceedings of Optical Fiber Communication Conference and National Fiber Optic Engineers Conference, Anaheim, California, 2006, 3 pages.

Qiu et al., "A WDM Passive Optical Network With Polarization-Assisted Multicast Overlay Control," IEEE Photonics Technology Letters 21(16):1133-1135, 2009.

Qiu et al., "A Novel Multicast Overlay Scheme for WDM Passive Optical Networks Using Optical Carrier Suppression Technique," 35th European Conference on Optical Communication, ECOC '09, 2009, 2 pages.

Son et al., "Bidirectional WDM Passive Optical Network for Simultaneous Transmission of Data and Digital Broadcast Video Service," Journal of Lightwave Technology 21(8):1723-1727, 2003.

Xu et al., "A WDM-PON with 10-Gb/s Symmetric Bit-Rates and Multicast Overlay with Delay-Based Multicast Control," Conference on Optical Fiber Communication, OFC 2009, San Diego, California, 2009, 3 pages.

Zhang et al., "A Multicast WDM-PON Architecture Using DPSK/NRZ Orthogonal Modulation," IEEE Photonics Technology Letters 20(17): 1479-1481, 2008.

* cited by examiner

METHODS AND SYSTEMS FOR MULTICAST CONTROL

TECHNICAL FIELD

The present application relates to a system and a method for controlling multicast data over WDM-PONs.

BACKGROUND

Nowadays, the high speed access network is mainly based on a technology of xDSL (Digital Subscriber Line). However, the limited bandwidth-distance product of a copper-based network will be a bottleneck for future multimedia-services. Foreseeing a rapid growth of the multimedia traffic and a trend of service convergence, it is obvious that a fiber-based access network will be an ultimate solution.

Time-division-multiplexed passive optical network (TDM-PON) systems such as broadband PON (BPON) and Ethernet PON (EPON) are being widely deployed in current generation fiber-based access networks for providing broadband access, offering triple play services including video, data and voice. In the near future, it is generally agreed that wavelength-division-multiplexed (WDM)-based access networks will be an enabler of the next-generation optical broadband access that requires large dedicated bandwidth and upgrade flexibility.

As the bandwidth-hungry video streams such as high-definition (HD) television become more and more pervasive in the access network, broadcast service is a very important issue in PON systems. Compared to the broadcast service, the multicast service can offer exclusive service to premium subscribers, thus generating more revenue. Broadcast can be easily realized in TDM-PON by power-splitting at a remote node (RN). However, such is more challenging for WDM-PON, due to the dedicated connection between the optical line terminal (OLT) and the optical network unit (ONU). To realize more flexible network functions, several schemes have been proposed to simultaneously deliver both point-to-point (p-t-p) data and broadcast/multicast data to subscribers in a WDM-PON.

There are two key issues facing transmission of both p-t-p and multicast data simultaneously in WDM-PON: 1). how to multiplex the p-t-p and multicast traffic; and 2). how to enable/disable multicast traffic flexibly. Subcarrier multiplexing could be employed to superimpose the multicast data on the p-t-p data (less than 1.5 Gb/s was demonstrated). However, a broadband modulator and oscillator, with a bandwidth of several times larger than the signal bit rate, are needed at the OLT and/or ONU sides. Recently, two schemes based on orthogonal modulation were proposed to superimpose a 10-Gb/s multicast data stream on the conventional 10-Gb/s downstream p-t-p data. As the upstream transmission was realized by re-modulating a part of downstream NRZ using a high extinction ratio (ER) when the multicast traffic was disabled, the bit rate of the upstream signals was limited to 2.5-Gb/s. To solve this problem, a delay based multicast control scheme has been proposed. However, the multicast traffic cannot be effectively disabled when its bit rate is lower than that of the downstream data.

SUMMARY

In one aspect, disclosed is a system for controlling multicast data, comprising:
a plurality of transceivers, each of which comprises a laser configured to generate an optical carrier, the generated optical carrier being modulated by electrical downstream point-to-point) p-t-p data so as to generate optical downstream p-t-p inverse return-to-zero (IRZ) signal;
a phase modulator PM configured to modulate the generated optical downstream p-t-p IRZ signal by electrical multicast data so as to generate orthogonally modulated signal; and
a delay interferometer (DI) configured to demodulate the orthogonally modulated data and having a frequency response peak or dip in response to the demodulating,
wherein an offset of a laser center wavelength of the laser from the frequency response peak or dip is adjustable so as to selectively enable or disable the multicast data.

In another aspect, disclosed is a method for controlling multicast data, comprising:
generating an optical carrier with a laser;
modulating the optical carrier with electrical downstream point-to-point (p-t-p) data so as to generate optical downstream p-t-p inverse return-to-zero (IRZ) data;
modulating the generated optical downstream p-t-p IRZ data with multicast data so as to generate orthogonally modulated signal;
demodulating the orthogonally modulated signal; and
adjusting an offset of a center wavelength of the laser from a frequency response peak or dip in response to the demodulating to selectively enable or disable the multicast data.

In another aspect, disclosed is a system for controlling multicast data, comprising:
a plurality of transceiver modules, each of which comprises:
  a laser with a center wavelength and configured to generate an optical carrier;
  an inverse return-to-zero (IRZ)-shaped data generating unit configured to generate an IRZ-shaped data from input downstream point-to-point (p-t-p) data and clock; and
  a first optical intensity modulator (IM) configured to modulate the optical carrier with the IRZ-shaped data to generate downstream p-t-p IRZ optical signal;
a PM configured to modulate the generated p-t-p IRZ optical signal with the multicast data so as to generate orthogonally modulated data;
a plurality of optical network units (ONUs), each of which comprises a delay interferometer (DI) configured to demodulate a first portion of the orthogonally modulated data and has a frequency response peak or dip in response to the demodulating,
wherein each of the transceiver modules further comprises an adjustment unit configured to adjust an offset of the center wavelength from the frequency response peak or dip so as to selectively enable or disable the multicast data.

In the application, the conventional point-to-point (p-t-p traffic) is transmitted in inverse return-to-zero (IRZ) format, the multicast traffic is transmitted in DPSK format, and the upstream traffic is transmitted in non-return-to-zero (NRZ) format. All the three traffics are transmitted on the same optical carrier.

DETAILED DESCRIPTION

Hereinafter, some embodiments of the application will be described in reference to the accompanying drawings.

Figure 1:
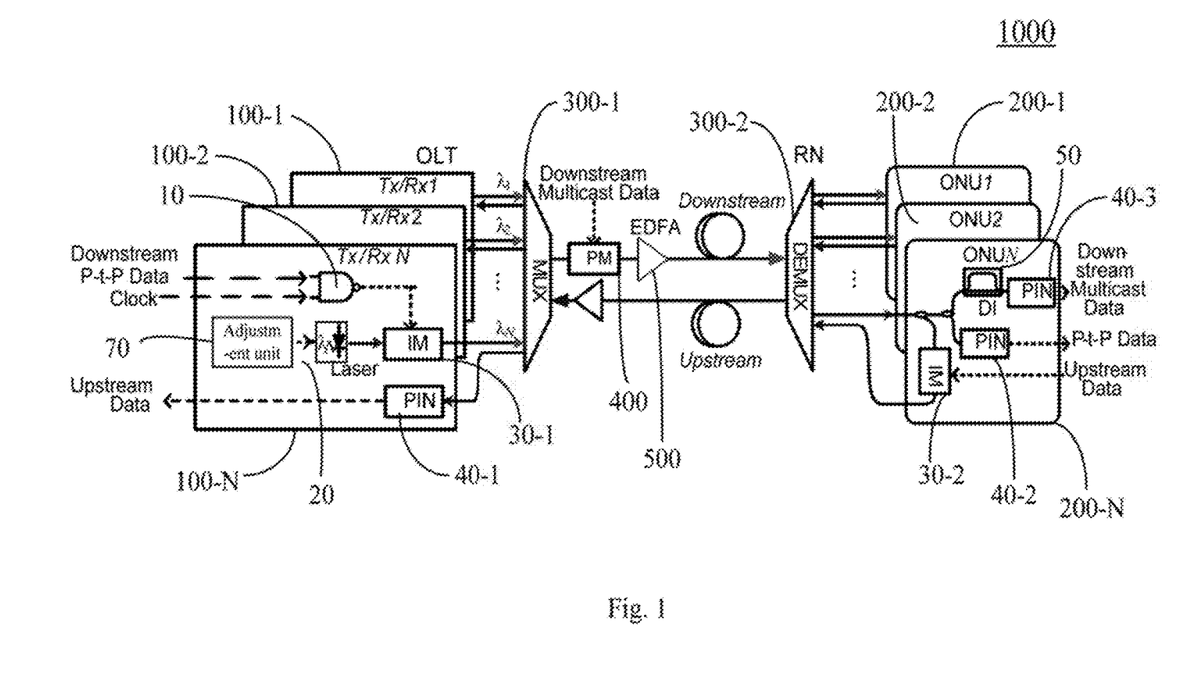
FIG. 1 illustrates architecture for the WDM-PON system according to one embodiment of the application.

FIG. 1 illustrates architecture for the WDM-PON system 1000 according to one embodiment of the application, which is exemplarily provided with a wavelength detuning-based multicast control and 10-Gb/s symmetric bit rates. As shown, the system 1000 comprises an optical line terminal (OLT) 100 with a plurality of transceiver modules 100-1, 100-2 . . . 100-N, and a plurality of the optical network units (ONUs) 200-1, 200-2, . . . , 200-N. The dashed lines on FIG. 1 denote electrical signal paths, whereas the solid lines denote optical paths.

According to the system 1000, all downstream point-to-point (p-t-p) data is modulated in inverse return-to-zero (IRZ) format in each of the transceiver modules 100-1, 100-2 . . . 100-n, and the modulated IRZ data is then multiplexed with multicast traffic via an orthogonal modulation. And then, the multicast data can be effectively disabled by slightly detuning a laser's wavelength at the transceiver modules, which has negligible effects on the p-t-p data. The laser is utilized to produce optical carriers. As will be discussed in detail below, the detuning may be performed by adjusting drive currents of the laser. In addition, the upstream data transmission is realized via re-modulating part of downstream power, and all the three kinds of data including downstream point-to-point data, downstream multicast data, and upstream data are transmitted over the same optical carrier.

Referring to FIG. 1 again, each of transceiver modules comprises an IRZ data generating unit 10 for generating electrical IRZ-shaped data signal from the downstream p-t-p data. For purpose of illustration, the IRZ data generating unit 10 is illustrated as a logic NAND gate with two inputs from the downstream p-t-p data and clock signal for controlling. It shall be appreciated that the unit 10 does not be limited to the logic NAND gate.

A laser 20 is arranged in each transceiver at OLT for generating the optical carrier for modulating. The laser 20 may be a distributed feedback (DFB) laser. As shown, the laser 20 may be controlled by a driving current so as to generate required laser wavelength, which will be discussed in detail latter. In on embodiment, to generate required laser wavelength, besides the control of driving currents, the laser 20 may be controlled by a temperature controller of the laser, which is well known in the art and thus the description thereof is omitted.

The unit 100 further comprises an optical intensity modulator (IM) 30-1 that is configured to utilize the electrical inverse return-to-zero (IRZ)-shaped data generated from unit 10 to modulate the optical carrier from laser 20 so as to generate downstream p-t-p IRZ optical signal. Alternatively, instead of using the IM 30-1, the electrical IRZ (inverse return-to-zero)-shaped data generated from unit 10 can directly modulate the laser wavelength of laser 20 to obtain the downstream p-t-p IRZ optical signal, provided that the laser 20 has sufficient modulation bandwidth, thus saving an IM. In one embodiment, any electro-optic intensity modulator can be used as the IM 30-1.

As shown, the system 1000 further comprises a MUX/DEMUX unit 300-1 and an optical phase modulator (PM) 400. The MUX/DEMUX unit 300-1 may be an arrayed waveguide grating (AWG). All the downstream p-t-p IRZ data generated at IM 30-1 are wavelength-multiplexed in the MUX/DEMUX unit 300-1. And then, multicast data encoded in differential phase-shift-keying (DPSK) format is superimposed onto the multiplexed IRZ p-t-p optical signals. In particular, the multiplexed IRZ p-t-p optical signals are orthogonally modulated by the PM 400 which is driven by the pre-coded multicast data. In the PM 400, two different data streams are modulated on the same optical carrier in two different dimensions. Specifically, the multiplexed IRZ p-t-p data are modulated in an amplitude dimension of the optical carrier whereas the multicast data are modulated in a phase dimension of the optical carrier. As at least half of bits are in a level of '1' in bits of the downstream IRZ signal, it can greatly facilitate this orthogonal modulation.

In the prior art, one straightforward way to multiplex the multicast traffic with the conventional p-t-p traffic is via TDM in electrical domain directly, thus resulting in the doubling of electrical bandwidth. Then the multiplexed electrical signal is converted to the optical signal via the IM 30-1 with a modulation bandwidth equals to the total data rate of the multicast traffic and the conventional p-t-p traffic. To the contrary, the multicast traffic and the conventional p-t-p traffic are multiplexed in optical domain via orthogonal modulation by the PM 400 in the application.

The p-t-p data and the multicast data should be bit synchronized by using the same clock signal at OLT. It shall be understood that clock signals are needed for generation of both the downstream p-t-p data and the multicast data. When a common clock signal is used by both the downstream p-t-p data and the multicast data, the p-t-p data and the multicast data can be easily bit synchronized.

After an amplification in an Erbium-doped Optical Fiber Amplifier (EDFA) 500, the orthogonally modulated signals are transmitted through fiber to a remote node's MUX/DE-MUX 300-2 to de-multiplex the orthogonally modulated signals, and then routed to the ONUs 200-1, 200-2, . . . , 200-N, for different wavelength of signals.

Referring to FIG. 1 again, each of ONUs 200-1, 200-2, . . . , 200-N may comprise an optical IM 30-2, a positive-intrinsic-negative (PIN) receiver 40-2, a PIN receiver 40-3 and a delay-interferometer (DI) 50. In one embodiment, one quarter of the received downstream data (signal power) is fed into the PIN receiver 40-2 for IRZ detection as downstream p-t-p data, and another quarter is demodulated by the DI 50 for DPSK detection as the multicast data. The remaining half of the data is fed into the IM 30-2 for upstream data re-modulation, which will be discussed later.

The DI 50 is configured to demodulate the multicast data from the received downstream data. To properly demodulate the multicast data, the laser center wavelength from the laser 20 shall coincide with a frequency response peak or dip of the DI 50, depending on whether a constructive or destructive port of the DI 50 is used for demodulation, respectively. A wavelength offset between the laser 20 and the DI 50 results in an imperfect interference within the DI 50, leading to receiving performance degradation. Therefore, in the embodiment as shown in FIG. 1, with the DI 50 arranged at each of the ONUs, the multicast control can be achieved via properly tuning the laser wavelength from the laser 20, which can be easily realized by adjusting the driving current of the laser 20. Around 3-mA change of the driving current of the laser 20 will induce 0.02-nm (a quarter of the free spectral range of the DI) wavelength offset between the laser and the DI, which can disable the multicast data. As shown in FIG. 1, each of transceiver modules 100-1, 100-2 . . . 100-N may comprise an adjustment unit 60 for adjusting the driving current of the laser 20 to adjust the offset so as to selectively enable or disable the multicast data.

In one embodiment, the multicast data may be in DPSK format. In this case, as the required wavelength detuning to disable the multicast data in DPSK format is much smaller than the channel spacing of an AWG arranged at the MUX/DEMUX unit 300-1 or 300-2, it has negligible effects on the p-t-p data.

Figure 2:
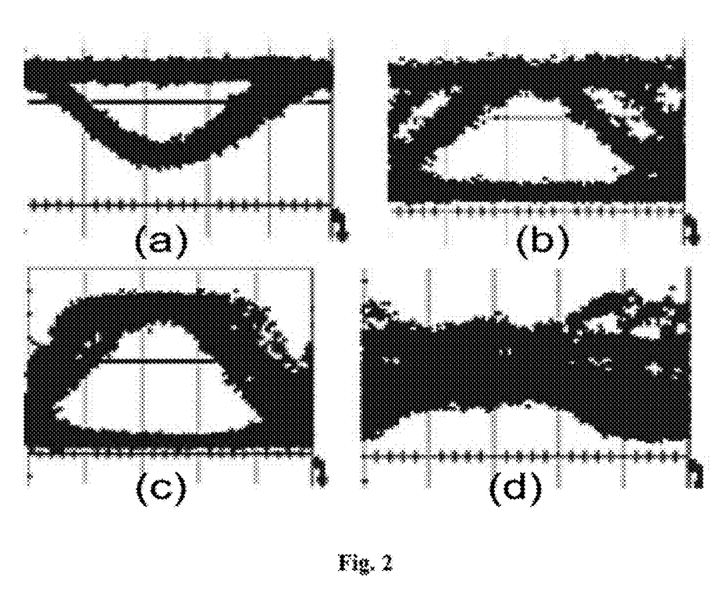
FIGS. 2(a)-2(d) illustrate the experimental demonstration of the multicast overlay scheme from the WDM-PON system as shown in FIG. 1.

Hereinafter, a detailed example will be given to describe how the components in system 1000 cooperates with each other in reference to FIGS. 2 (*a*)-(*d*).

At a transceiver of OLT, for example 100-N, continuous-wave light at 1549.485 nm is generated by the laser 20, which is under a temperature control. The generated continuous-wave light at 1549.485 nm is IRZ modulated by the IM 30-1 with a 10-Gb/s $2^{31}-1$ pseudorandom binary sequence (PRBS). The resultant output of the IRZ data from the MUX/DEMUX unit 300-1 has an ER of ~4 dB and is fed into the PM 400. The PM 400 is in turn driven by a 10-Gb/s PRBS as the multicast data, to generate the optical DPSK signal. Although it is not shown, it shall be understood in the art that, to generate correct optical DPSK, the driving electrical signal should first encoded by an electrical differential precoder which is basically an XOR gate with two inputs, one is the input data and the other one is the one-bit delayed XOR gate output. In most of the experiment demonstration, the precoding is not implemented for the BER measurement if PRBS is used, as the precoded PRBS data is just the original PRBS with several bits of delays.

The multicast data and the IRZ data are orthogonally modulated in the PM 400, and then amplified by the EDFA 500.

The orthogonally modulated and amplified data has an average power of 5 dBm and is coupled into a 20-km dispersion-shifted fiber to emulate a dispersion-compensated transmission between the OLT and at the MUX/DEMUX unit 300-2 in the RN. A 100-GHz AWG with a 3-dB bandwidth of ~0.6 nm and an insertion loss of 4.5 dB is used at the MUX/DEMUX unit 300-2. At the ONU 100-N, one quarter of the received downstream data is fed into the PIN receiver 40-2 for IRZ detection as downstream p-t-p data, which is shown as a clear eye in FIG. 2(*a*).

Another quarter of the received downstream data is demodulated by the DI 50 with a relative delay of 94.3 ps for DPSK detection as the multicast data. The remaining half of the power is fed into the optical IM 30-2, driven by a non-return-to-zero (NRZ) 10-Gb/s $2^{31}-1$ PRBS as the upstream data, before being transmitted back to the OLT via another piece of 20-km dispersion-shifted fiber. The recovered clock from a clock recovery circuit (not shown) in the PIN receiver 40-2 for the downstream p-t-p data will be used for the synchronization of the upstream data with the downstream IRZ p-t-p signal so that the upstream data is modulated on a high power portion of the IRZ bits. The eye diagram of the detected upstream signal at the OLT is shown in FIG. 2(*b*). According to one embodiment, the half of modulated downstream data carried on the optical carriers is further modulated with the upstream data in the optical IM 30-2. The further modulated signals at all of ONUs wavelength-multiplexed at the MUX/DEMUX unit 300-2, and then transmitted to the MUX/DEMUX unit 300-2, in which wavelength-multiplexed signals are de-multiplexed. And then, the PIN receiver 40-1 operates to detect the upstream dada from the de- multiplexed signal/data.

When the multicast data is enabled, the driving current of the laser 20 shall be carefully adjusted, such that the center wavelength of the light from the laser 20 coincides with the frequency response dip of the DI 50 in the case that the destructive port of the DI 50 is used for DPSK demodulation. With the optimal driving current of 59.2 mA, the superimposed DPSK multicast data is successfully detected at the ONU, which is shown as a clear eye diagram in FIG. 2(*c*).

On the contrary, when the driving current of the laser 20 is adjusted to 62.6 mA, its center wavelength is shifted by around 0.02 nm, moving from the frequency response dip of the DI 50 to a middle point between this dip and its adjacent peak. Then the superimposed DPSK multicast data cannot be detected at the ONU. In other words, the multicast data is disabled. Its fully-closed eye diagram is depicted in FIG. 2(*d*).

Figure 3:
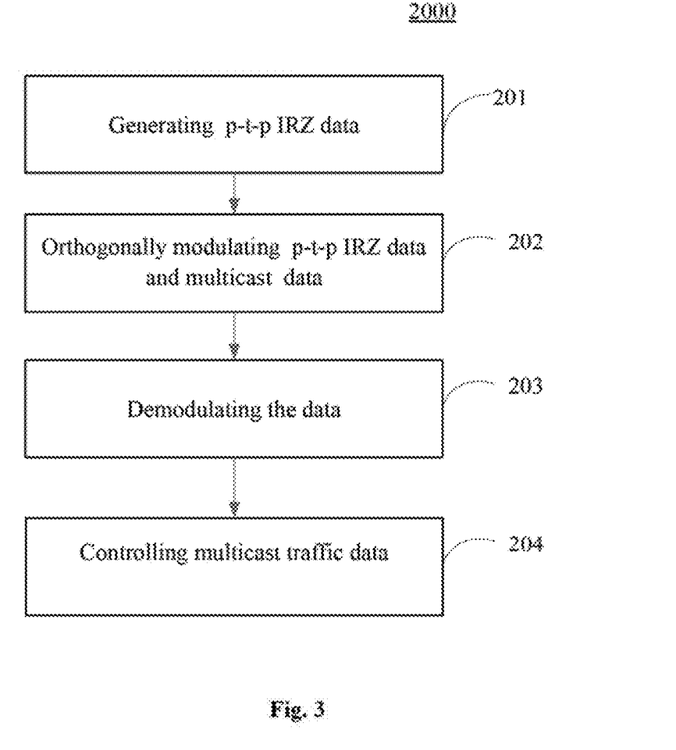
FIG. 3 illustrates a flow chart for multiplexing multicast data with downstream p-t-p data according to one embodiment of the application.

Hereinafter, a method 2000 for multiplexing multicast traffic data with p-t-p traffic data will be discussed.

At step S201, an optical carrier generated by a laser is modulated by an electrical downstream p-t-p data so as to generate downstream p-t-p IRZ signal. As stated in the above, an IRZ-shaped signal may be generated from downstream p-t-p traffic data and clock signal by an IRZ data generating unit, which may be a logic NAND gate with two inputs from the downstream p-t-p data and the clock signals for controlling; and then the generated IRZ-shaped signal is used to modulate the optical carrier so as to generate the p-t-p IRZ signal. The modulation may be processed in an optical intensity modulator (IM) or through direct modulation on the laser.

At step S202, the generated optical p-t-p IRZ signal is further modulated by the electrical multicast traffic data via a phase modulator so as to generate the orthogonally modulated signals. Specifically, the generated optical p-t-p IRZ signal is modulated in an amplitude dimension of optical carrier whereas the electrical multicast data are modulated in a phase dimension of optical carrier. Herein, at least half of bits in the downstream IRZ signal generated in step S201 are in a level of '1' so as to facilitate this orthogonal modulation. According to one embodiment of the present application, the orthogonally modulated signals are then transmitted to ONUs, such as the ONUs 200-1, 200-2, . . . , 200-N as stated in the above.

And then, at step S203, the orthogonally modulated signal is demodulated. Specifically, a first portion of the orthogonally modulated signals is demodulated as downstream p-t-p data, and a second portion of the orthogonally modulated signal is demodulated with a DI as multicast traffic data. And the remaining portion of the orthogonally modulated signal is further modulated with an upstream data at an ONU. The further modulated data may be transmitted to an OLT, in which the upstream data may be detected, for example, with the above mentioned PIN receiver 40-1. In addition, at the ONU, a clock may be recovered from the downstream p-t-p data, and the recovered clock may be unitized to synchronize the upstream data with the downstream IRZ p-t-p so that the upstream data is modulated on a high power portion of the IRZ bits.

At Step S204, an offset between the laser center wavelength and the frequency response peak or dip of the DI at ONU is adjusted so as to selectively enable or disable the multicast traffic data. As mentioned in the above, the optical carrier may be generated by the laser under a control of a driving current and a temperature. In this case, the laser center wavelength may be adjusted to control the offset of the laser center wavelength from the frequency response peak or dip so as to selectively enable or disable the multicast traffic data. In particular, the driving current is adjusted to tune the laser center wavelength. In particular, the laser center wavelength shall coincide with the frequency response dip in case that the multicast data is enabled.

Figure 4:
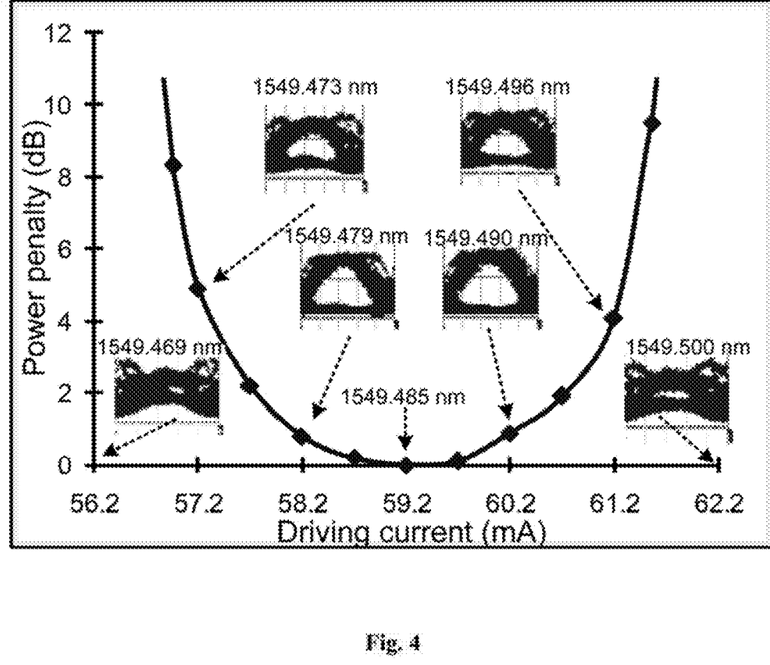
FIG. 4 illustrates power penalty versus laser driving current and wavelength detuning for multicast control according to one embodiment of the application.

FIG. 4 illustrates power penalty versus laser driving current and wavelength detuning for multicast control. No performance degradation was observed for the p-t-p signals when the laser wavelength is tuned for multicast traffic control, and the output power variation of the downlink EDFA was within 0.1 dB. To quantitatively show the effect of wavelength detuning on multicast control via the laser driving current adjustment, the power penalty of the multicast DPSK signals for different driving current is measured and depicted in FIG. 3.

Figure 5:
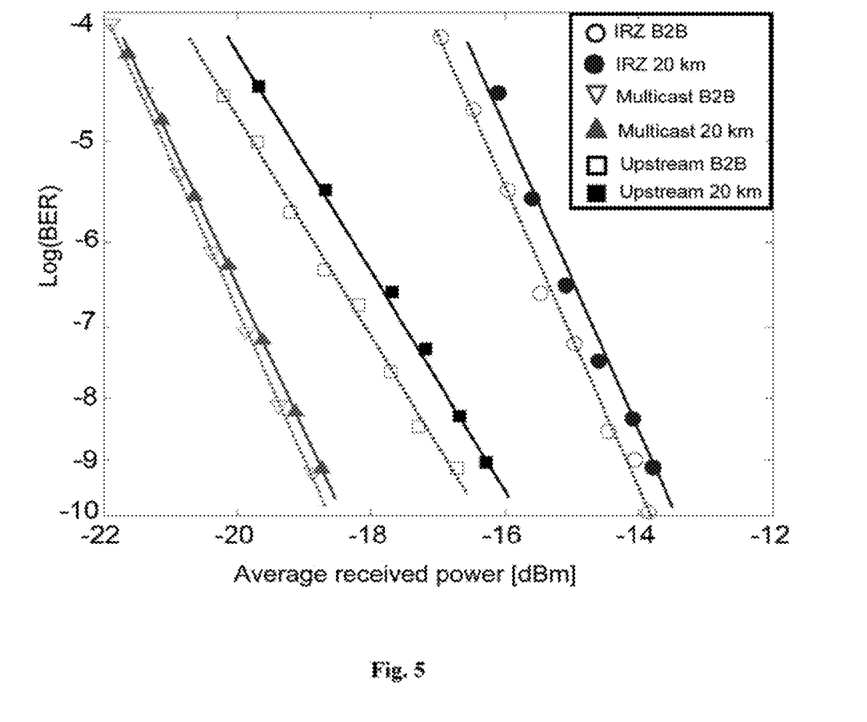
FIG. 5 illustrates the bit error rate (BER) measurements for the multicast control according to one embodiment of the application.

FIG. 5 illustrates BER measurements for the average received power. The eye diagrams for different laser driving current are depicted by the insets, and the increasing degradation by the wavelength detuning is shown clearly. The BER measurement results are shown in FIG. 5. After 20-km transmission, for the downstream p-t-p and multicast enabled signals, negligible power penalty is observed. For the upstream signals, less than 0.7-dB power penalty, mainly due to the degraded waveform, is observed.

Features, integers, characteristics, compounds, compositions, or combinations described in conjunction with a particular aspect, embodiment, implementation or example disclosed herein are to be understood to be applicable to any other aspect, embodiment, implementation or example described herein unless incompatible therewith. All of the features disclosed in this application (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments and extends to any novel one, or any novel combination, of the features disclosed in this specification (including any accompanying claims, abstract and drawings), or to any novel one, or any novel combination, of the steps of any method or process so disclosed.

What is claimed is:

1. A system for controlling multicast data, comprising:
   a plurality of transceivers, each of which comprises a laser configured to generate an optical carrier, the generated optical carrier being modulated by electrical downstream point-to-point (p-t-p) data so as to generate optical downstream p-t-p inverse return-to-zero (IRZ) signal;
   a phase modulator (PM) configured to modulate the generated optical downstream p-t-p IRZ signal by electrical multicast data so as to generate orthogonally modulated signal; and
   a delay interferometer (DI) configured to demodulate the orthogonally modulated data and having a frequency response peak or dip in response to the demodulating,
   wherein an offset of a laser center wavelength of the laser from the frequency response peak or dip is adjustable so as to selectively enable or disable the multicast data.

2. A system of claim 1, wherein each of transceivers comprises an adjustment unit configured to adjust the offset so as to selectively enable or disable the multicast data.

3. A system of claim 2, wherein the laser center wavelength coincides with the frequency response dip in case that the multicast data is enabled.

4. A system of claim 1, wherein each of transceivers further comprises:
   an IRZ-shaped data generating unit configured to generate electrical IRZ-shaped data from the downstream p-t-p data and clock signal; and
   a first optical intensity modulator (IM) configured to modulate the optical carrier with the generated electrical IRZ-shaped data to generate the optical downstream p-t-p IRZ signal.

5. A system of claim 1, wherein the PM is further configured to modulate the generated optical downstream p-t-p IRZ signal with the electrical multicast data, such that the generated optical downstream p-t-p IRZ signal is modulated in an amplitude dimension of the optical carrier, and the electrical multicast data is modulated in a phase dimension of the optical carrier.

6. A system of claim 1, further comprising an optical line terminal (OLT) and a plurality of optical network units (ONUs), wherein the transceivers are arranged in the OLT and each of the ONUs comprises the DI.

7. A system of claim 6, wherein each of the ONUs further comprises:
   a first positive-intrinsic-negative (PIN) receiver configured to detect a first portion of the orthogonally modulated data as the downstream p-t-p data by detecting a power level of the optical downstream p-t-p IRZ signal.

8. A system of claim 1, wherein at least half of bits in the downstream IRZ data are in a level of '1'.

9. A system of claim 4, wherein the IRZ-shaped data generating unit comprises a logic NAND gate.

10. A system of claim 7, wherein each of the ONUs further comprises:
    a second optical intensity modulator (IM) configured to modulate a second portion of the orthogonally modulated signal with an upstream data.

11. A system of claim 10, wherein each of the transceivers further comprises:
    a second PIN receiver configured to detect the upstream data.

12. A system of claim 10, wherein the first PIN receiver further comprises
    a clock recovery circuit configured to recovery a clock from the downstream p-t-p data, the recovered clock being for a synchronization of the upstream data with the downstream IRZ p-t-p so that the upstream data is modulated on a high power portion of the IRZ bits.

13. A method for controlling multicast data, comprising:
    generating an optical carrier with a laser;
    modulating the optical carrier with electrical downstream point-to-point (p-t-p) data so as to generate optical downstream p-t-p inverse return-to-zero (IRZ) data;
    modulating the generated optical downstream p-t-p IRZ data with multicast data so as to generate orthogonally modulated signal;
    demodulating the orthogonally modulated signal; and
    adjusting an offset of a center wavelength of the laser from a frequency response peak or dip in response to the demodulating to selectively enable or disable the multicast data.

14. A method of claim 13, wherein modulating the optical carrier with the electrical downstream p-t-p data further comprises:
    generating an IRZ-shaped data from the electrical downstream p-t-p data and clock signal; and
    modulating the optical carrier with the generated IRZ-shaped data so as to generate the p-t-p IRZ optical signal.

15. A method of claim 13, wherein the optical carrier is generated by the laser under a control of a driving current and a temperature.

16. A method of claim 15, wherein the adjusting further comprises:
adjusting the center wavelength to control the offset so as to selectively enable or disable the multicast data.

17. A method of claim 16, wherein the driving current is adjusted to tune the center wavelength.

18. A method of claim 13, wherein at least half of bits in the downstream IRZ data are in a level of '1'.

19. A system for controlling multicast data, comprising:
a plurality of transceiver modules, each of which comprises:
a laser with a center wavelength and configured to generate an optical carrier;
an inverse return-to-zero (IRZ)-shaped data generating unit configured to generate an IRZ-shaped data from input downstream point-to-point (p-t-p) data and clock; and
a first optical intensity modulator (IM) configured to modulate the optical carrier with the IRZ-shaped data to generate downstream p-t-p IRZ optical signal;
a PM configured to modulate the generated p-t-p IRZ optical signal with the multicast data so as to generate orthogonally modulated data;
a plurality of optical network units (ONUs), each of which comprises a delay interferometer (DI) configured to demodulate a first portion of the orthogonally modulated data and has a frequency response peak or dip in response to the demodulating,
wherein each of the transceiver modules further comprises an adjustment unit configured to adjust an offset of the center wavelength from the frequency response peak or dip so as to selectively enable or disable the multicast data.

20. A system of claim 19, wherein each of the ONUs further comprises:
a positive-intrinsic-negative (PIN) receiver (40-3) configured to detect a second portion of the orthogonally modulated data as the downstream p-t-p data.

21. A system of claim 19, wherein the IRZ-shaped data generating unit comprises a logic NAND gate.

22. A system of claim 19, wherein each of the ONUs further comprises:
a second optical intensity modulator (IM) configured to modulate a third portion of the orthogonally modulated data with upstream data.

23. A system of claim 22, wherein each of the transceivers further comprises:
a second PIN receiver (40-1) configured to detect the upstream data.

24. A system of claim 23, wherein the first PIN receiver (40-2) further comprises:
a clock recovery circuit configured to recovery a clock from the downstream p-t-p data, the recovered clock being for a synchronization of the upstream data with the downstream IRZ p-t-p so that the upstream data is modulated on a high power portion of the IRZ bits.

25. A system of claim 24, wherein the laser is controlled by a driving current, the driving current being adjusted to tune the center wavelength.

26. A system of claim 19, wherein at least half of bits in the downstream IRZ data are in a level of '1'.

27. A method for controlling multicast data, comprising:
receiving downstream point-to-point (p-t-p) data at an optical line terminal (OLT);
modulating an optical carrier from a laser with downstream point-to point (p-t-p) data so as to generate downstream optical p-t-p inverse return-to-zero (IRZ) signal at the OLT;
receiving downstream multicast data at a phase modulator;
modulating the generated downstream optical p-t-p IRZ signal with the multicast data by the phase modulator so as to generate orthogonally modulated signal;
demodulating, at a delay interferometer (DI) arranged in an optical network unit (ONU), a portion of the orthogonally modulated data; and
adjusting an offset of a center wavelength of the laser from a frequency response peak or dip of the DI to selectively enable or disable the multicast data.

28. A method of claim 27, further comprising:
detecting, at the ONU, a portion of the orthogonally modulated data as the downstream p-t-p data.

29. A method of claim 27, wherein modulating an optical carrier with the downstream P-t-P data further comprises:
generating an IRZ-shaped data from the downstream p-t-p data and clock signal; and
modulating the optical carrier with the generated IRZ-shaped data so as to generate the p-t-p IRZ optical signal.

30. A method of claim 28, further comprising:
modulating, at the ONU, another portion of the orthogonally modulated data with upstream data.

31. A method of claim 30, further comprising:
detecting, at the OLT, the upstream data from the modulated data.

32. A method of claim 30, further comprising:
recovering a clock from the downstream p-t-p data; and
synchronizing the upstream data and the downstream IRZ p-t-p with the recovered clock so that the upstream data is modulated on a high power portion of the IRZ bits.

33. A method of claim 27, wherein the optical carrier is generated by the laser under a control of a driving current and a temperature.

34. A method of claim 33, wherein the driving current is adjusted to tune the center wavelength.

35. A method of claim 27, wherein at least half of bits in the downstream IRZ data are in a level of '1'.

* * * * *